May 7, 1968

C. E. LAMONT 3,381,409

GROWTH CHAMBERS

Filed Sept. 23, 1966

United States Patent Office 3,381,409
Patented May 7, 1968

3,381,409
GROWTH CHAMBERS
Charles E. Lamont, Winnipeg, Manitoba, Canada, assignor to Controlled Environments Limited, Winnipeg, Manitoba, Canada
Filed Sept. 23, 1966, Ser. No. 581,517
Claims priority, application Canada, June 7, 1966, 962,290
4 Claims. (Cl. 47—17)

This invention relates to improvments in so-called growth rooms or chambers. The main function of growth chambers is to serve as enclosed spaces for the growing of plants under carefully controlled conditions, for example with the temperature and humidity of the air closely regulated and with the application of light to the plants carried out in accordance with a required program. Such growth chambers are commonly used in the carrying out of experimental work on plant growth. Growth chambers may also be used to sustain animal, rather than plant life, under controlled conditions, as will be more fully explained below.

To control and/or record the temperature and humidity of the air in the growth chamber, it is necessary to provide appropriate means for sensing its actual temperature and humidity, in order to detect any deviation from the desired values and thereby make appropriate corrections to the equipment that supplies conditioned air to the chamber.

The air conditions will not be exactly the same in all horizontal planes of the chamber and it has been found that, as a practical matter, it is unsatisfactory merely to sense the temperature and humidity of the air at a fixed location in the chamber. When the chamber is used for plant life, there are various horticultural reasons for preferring a method of operation in which the temperature and humidity of the air are sensed at the level of the upper foliage of the plants. As the plants grow, this level will rise, and, in order to take care of this problem, prior constructions of growth chambers have employed an aspirator tube for withdrawing samples of air from the chamber with a bracket on one wall of the chamber for supporting this tube at various different levels. By this means, every few days the operator can move the bracket supporting the tube up to a new location on the wall and secure it in place.

A difficulty remains, however, due to the fact that it is preferable to sample the air near the center of the chamber, rather than close to a side wall, in order to achieve a representative indication of the average conditions prevailing throughout the length and breadth of the chamber. In view of this requirment, it has been the practice to arrange for the tube to extend from its wall fixing and project across the chamber from the wall to a generally central location in the chamber. Since this tube extends at approximately the level of the upper leaves of the plants, in order to sample the air at this level, it can hardly avoid some interference with the growth of these plants. More particularly the tube tends to shade some of the plants more than others from the light emanating from the usual ceiling illumination of such chambers. This differential shading together with the actual physical contact between plants and tube has the effect of reducing the uniformity of conditions to which all the plants in the chamber are subjected. This is an undesirable situation, especially when the plants are being closely controlled for experimental or other scientific purposes. In the past this difficulty has often meant that the operator will find it preferable to forego the use of some of the floor space in the chamber (namely that in the vicinity of the tube) rather than accept interference from the tube. It is clearly desirable that as much as possible of the floor space should be usefully employed.

When the chamber is used for animal life, similar requirements exist. Research work done on animals may require controlled temperature and humidity, and often ceiling lighting is provided. Animals are placed in cages on shelves, and, as in the case of plants, the scientist may wish to sample the air at a given level in the chamber for control or recordal purposes. An aspirator tube projecting from the side wall would be more inconvenient for this purpose, because it would tend to interfere with the free availability of all parts of the chamber. Moreover, it would be necessary to forego use of some wall space for cage shelves, if provision were to be made to move the tube between different levels in the manner described above for plant chambers.

The object of the present invention is to provide an improved construction of growth chamber and air sampling device therein, such construction being calculated to overcome the foregoing disadvantages.

One method of carrying the invention into practice in relation to a plant growth chamber is illustrated diagrammatically and by way of example only in the accompanying drawings.

Figure 1:
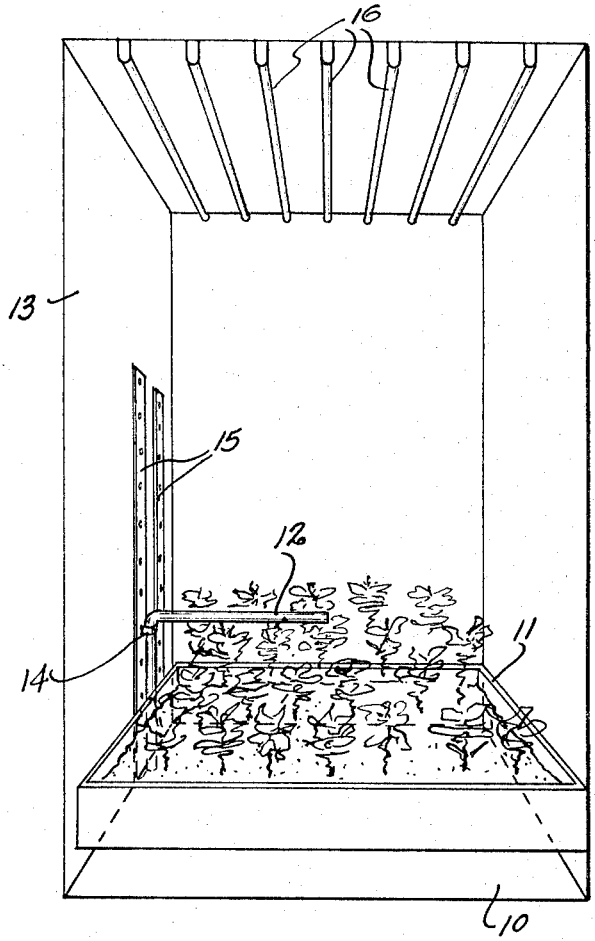
FIGURE 1 shows a typical prior art form of growth chamber with plants growing therein and an air sampling aspirator tube.

The prior form of growth chamber shown in FIGURE 1 comprises a floor 10 on which plants 11 are supported. An aspirator tube 12 for sampling air from the center of the chamber extends at the level of the tops of the plants into the chamber from the wall 13 to which it can be fixed at various levels by a bracket 14 engaging fittings 15. The chamber is illuminated by lights 16.

Figure 3:
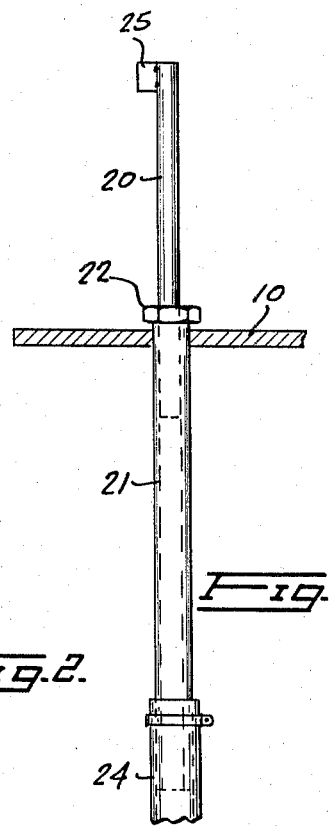
FIGURE 3 shows a larger scale, fragmentary view of the lower structure of the apparatus of FIGURE 2.
Figure 2:
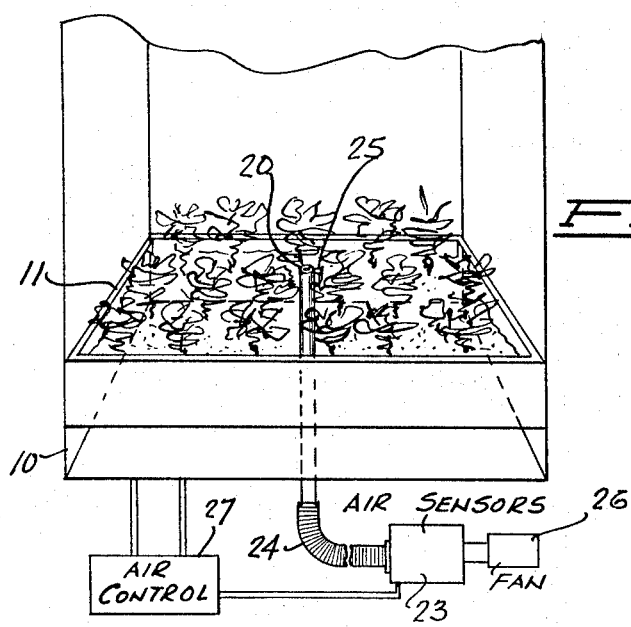
FIGURE 2 shows a similar growth chamber with an air sampling tube arranged in accordance with the present invention.

FIGURE 2 shows an aspirator tube construction in accordance with the present invention, comprising a tube 20 which projects upwardly in a vertical direction from the center of the floor 10. The tube 20 is slidably mounted in a telescopic manner within a fixed tube 21 (FIGURE 3) and can be moved vertically up and down to project to a desired height, in accordance with the growth of the plants. Once positioned where needed, the tube 20 can be fixed in position by the tightening of a nut 22 in the conventional way.

A conventional aspirator box 23 is provided beneath the floor 10 or at some other location remote from the growth area. A fan 26 draws air in through the mouth of the tube 20, down the tubes 20 and 21 and then through a flexible conduit 24 to be analyzed by conventional sensors (not shown) in the aspirator box 23. The sensors mainly required will be one for the temperature of the air and one for the humidity of the air, although when required a sensor for the carbon dioxide content may also be used, as indeed may any other sensor for any condition of the air in the growth chamber that may be pertinent to the experiments in hand. In addition, a light sensor 25 of a conventional type may be mounted on the upper end of the tube 20 to aid in the maintenance of a record of the light intensity at the level of the upper plant foliage generated by the overhead illumination.

It is possible by means of this invention to obtain a sample of air for sensing purposes at the desired location, which location can readily be varied as the plants grow, and yet this result is achieved with virtually no adverse effect on the plants. In particular there is substantially no shading of the plants, in contrast to that produced by a horizontally extending tube, such as the tube 12 of FIGURE 1. In addition physical contact between the tube and the plant leaves is greatly reduced.

The remainder of the apparatus, comprising means for controlling the air conditions in the growth chamber in accordance with the conditions detected by the sensors, is conventional and has accordingly not been illustrated in detail, being shown merely as apparatus 27.

As an alternative to the construction illustrated, the aspirator tube could extend downwardly from the ceiling of the chamber, rather than upwardly from the floor, at the same time being similarly movable in relation to its degree of projection into the chamber, in order to enable its mouth always to be maintained at the height of the plants. Yet another alternative would be the use of a fixed tube, which projects upwardly from the floor or downwardly from the ceiling, or both, such tube having an opening in its side and means for adjusting the height of the opening so that the same effect is achieved, namely that air is drawn into the tube at the desired height. This latter form of tube might have a number of openings spaced along its length, shutters or the like being provided for uncovering one opening at a time.

As already mentioned, the invention is also applicable to an animal chamber. The structure of the chamber will be essentially the same as is shown in FIGURE 2, except that shelves will be arranged around the walls. The arrangement and function of the aspirator tube 20 will be unchanged and consequently no further illustration of the invention as applied to an animal growth chamber is deemed necessary.

I claim:
1. In an enclosed growth chamber including walls and a floor for supporting plant or animal life;
  (a) means for controlling in said chamber at least one of the condition including air temperature, air humidity and air carbon dioxide content, for the furtherance of the controlled growth of said life, said control means including sensing means for sensing said at least one condition in sample air supplied thereto,
  (b) a vertically extending aspirator tube mounted in said chamber at a location remote from the walls thereof,
  (c) means connected to said tube for varying the height of an opening in said tube to enable said opening to be maintained at a desired level,
  (d) and means for drawing sample air through said opening into said tube and for supplying said sample air to said sensing means.
2. A growth chamber according to claim 1,
  (e) including means mounting said tubes to project upwardly from the floor,
  (f) the tube terminating in a mouth which constitutes said opening,
  (g) said means (c) for varying the height of the opening comprising means connected to the tube for varying the extent of upward projection of the tube from the floor.
3. A growth chamber according to claim 2, wherein said means (g) comprises
  (h) a second tube extending vertically below said floor for receiving the aspirator tube for slidable engagement therein,
  (i) and means for securing the tubes together in a desired relationship.
4. A growth chamber according to claim 3, including
  (j) a source of illumination secured to the ceiling,
  (k) and a light sensor secured to the upper end of the aspirator tube for measuring the light intensity at the level of said opening.

No references cited.

ROBERT E. BAGWILL, *Primary Examiner.*